United States Patent
Ambroziak (10) Patent No.: US 6,415,319 B1
(45) Date of Patent: *Jul. 2, 2002

(54) INTELLIGENT NETWORK BROWSER USING INCREMENTAL CONCEPTUAL INDEXER

(75) Inventor: Jacek R. Ambroziak, Acton, MA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/797,630

(22) Filed: Feb. 7, 1997

(51) Int. Cl.[7] ............................................. G06F 15/16
(52) U.S. Cl. ........................ 709/219; 707/513; 707/103
(58) Field of Search ................................ 395/611, 603, 395/614, 615, 777, 793; 709/202, 203, 206, 217, 219; 707/103, 513

(56) References Cited

U.S. PATENT DOCUMENTS

| | | | |
|---|---|---|---|
| 4,839,853 A | 6/1989 | Deerwester et al. | 395/605 |
| 4,849,898 A | 7/1989 | Adi | 364/419.1 |
| 4,984,178 A | 1/1991 | Hemphill et al. | 395/759 |

(List continued on next page.)

FOREIGN PATENT DOCUMENTS

WO     WO 96/12236     4/1996

OTHER PUBLICATIONS

Okada et al., Agent–based Approach for Information Gathering on Highly Distributed and Heterogeneous Environment, IEEE Ref. No. 0–8186–7267–6/96, pp. 80–87, Jun. 1996.*

Hof, This Web Agent Knows What You Like, Business Week, New York, Sep. 23, 1996, p. 142E.*

Webb, Intelligent agents on the Internet, Editor & Publisher, New York, Mar. 25, 1995, pp. 50ff.*

Peterson, The evolution of intelligent agents, Business Communications Review, Hinsdale, Nov. 1996, pp. 38–41.*

Quintana, Y: "Knowledge–Based Information Filtering of Financial Information," Proceedings of the National Online Meeting, May 13, 1997, pp. 279–285.

Obraczka, K., et al., "Internet Resource Discovery Services," Computer, vol. 26, No. 9, Sep 1, 1993, pp. 8–22.

"Conceptual Indexing for Precision Content Retrieval," Knowledge Technology Group, Sun Microsystems Laboratories, Chelmsford,. MA, Dec. 13, 1996.

Lieberman, Henry, "Letizia: An Agent That Assists Web Browsing," Media Laboratory, Massachusetts Institute of Technology, Cambridge, MA, Aug. 1995.

"WBI: Configuring Your Browser," IBM Web Browser Intelligence, Raleigh, N.C., Dec. 13, 1996.

Woods, William A. and Schmolze, James G., "The KL–ONE Family," Harvard University, Center for Research in Computing Technology, Aiken Computation Laboratory, Cambridge, MA, Aug. 3, 1990, pp. 1–61.

(List continued on next page.)

Primary Examiner—Glenton B. Burgess
Assistant Examiner—Bradley Edelman
(74) Attorney, Agent, or Firm—Finnegan, Henderson, Farabow, Garrett & Dunner, LLP (57) ABSTRACT

Network browsing is facilitated by receiving a document from the network containing content; extracting conceptual information from the content of the document; analyzing the extracted conceptual information semantically; and assimilating the extracted conceptual information into an index based on structural relationships among the extracted conceptual information and semantic data in a stored lexicon.

8 Claims, 9 Drawing Sheets

U.S. PATENT DOCUMENTS

| | | | |
|---|---|---|---|
| 5,062,074 A | 10/1991 | Kleinberger | 395/605 |
| 5,276,616 A | 1/1994 | Kuga et al. | 364/419.08 |
| 5,301,109 A | 4/1994 | Landauer et al. | 364/419.19 |
| 5,321,833 A | 6/1994 | Chang et al. | |
| 5,325,298 A | 6/1994 | Gallant | 364/419.19 |
| 5,404,514 A | 4/1995 | Kageneck et al. | 395/605 |
| 5,418,918 A | 5/1995 | Turtle | 395/600 |
| 5,418,943 A | 5/1995 | Borgida et al. | |
| 5,418,951 A | 5/1995 | Damashek | 395/605 |
| 5,428,778 A | 6/1995 | Brookes | 395/605 |
| 5,440,481 A | 8/1995 | Kostoff et al. | 364/419.19 |
| 5,450,580 A | 9/1995 | Takada | 395/600 |
| 5,475,588 A | 12/1995 | Schabes et al. | 395/2.64 |
| 5,544,352 A | 8/1996 | Egger | 395/600 |
| 5,708,825 A * | 1/1998 | Sotomayor | 707/501 |
| 5,724,571 A * | 3/1998 | Woods | 707/5 |
| 5,768,578 A * | 6/1998 | Kirk et al. | 395/611 |
| 5,822,539 A * | 10/1998 | Van Hoff | 709/236 |
| 5,870,559 A * | 2/1999 | Leshem et al. | 709/224 |
| 5,894,554 A * | 4/1999 | Lowery et al. | 709/203 |
| 5,918,013 A * | 6/1999 | Mighdoll et al. | 709/217 |
| 5,918,237 A * | 6/1999 | Montalbano | 707/513 |
| 5,937,163 A * | 8/1999 | Lee et al. | 709/218 |
| 6,026,409 A * | 2/2000 | Blumenthal | 707/104 |
| 6,032,196 A * | 2/2000 | Monier | 709/245 |
| 6,038,561 A * | 3/2000 | Snyder et al. | 707/6 |
| 6,081,829 A * | 6/2000 | Sidana | 709/203 |
| 6,101,491 A * | 8/2000 | Woods | 707/3 |
| 6,263,335 B1 * | 7/2001 | Paik et al. | 707/5 |

OTHER PUBLICATIONS

Woods, William A., "Understanding Subsumption and Taxonomy: A Framework for Progress," Harvard University, Center for Research in Computing Technology, Aiken Computation Laboratory, Cambridge, MA, Aug. 15, 1990, pp. 1–61.

O'Leary, Daniel E., "The Internet, Intranets, and the AI Renaissance," IEEE Computer, Jan. 1997, pp. 71–78.

Salton, G., et al., "Approaches to Passage Retrieval in Full Text Information Systems," Proceedings of the Sixteenth Annual International ACM SIGIR Conference on Research and Development in Information Retrieval (SIGIR 93), ACM Press, 1993, pp. 49–58.

Callan, J.P., "Passage–level Evidence in Document Retrieval," Proceedings of the Seventeenth Annual International ACM–SIGIR Conference on Research and Development in Information Retrieval (SIGIR 94), Springer–Verlag, 1994, pp. 302–310.

Wilkinson, R., "Effective Retrieval of Structure Documents," Proceedings of the Seventeenth Annual International ACM–SIGR Conference on Research and Development in Information Retrieval (SIGIR 94), Springer–Verlag, 1994, pp. 311–317.

Eric Brill, "Some Advances in Transformation–Based Part of Speech Tagging,"AAAI Conference, 1994.

Mittendorf, E.,et al., "Document and Passage Retrieval Based on Hidden Markov Models," Proceedings of the Seventh Annual International ACM–SIGIR Conference on Research and Developmednt in Information Retrieval (SIGR 94), Springer–Verlag, 1994, pp. 318–327.

* cited by examiner

INTELLIGENT NETWORK BROWSER USING INCREMENTAL CONCEPTUAL INDEXER

BACKGROUND OF THE INVENTION

A. Field of the Invention

This invention relates generally to methods for browsing network information and, more particularly, to a method for organizing information from network documents in a conceptual index to facilitate browsing.

B. Description of the Related Art

The Internet, fueled by the phenomenal popularity of the World Wide Web (WWW or Web), has exhibited exponential growth over the past few years. In the case of the WWW, the ease of self-publication has helped generate an estimated 50–120 million documents.

To access all this information, users need only standard computer equipment, such as a home personal computer with a display and modem, and an Internet connection. Several types of Internet connections are available, including connections through Internet Service Providers (ISPs). To use an Internet connection from an ISP, for example, the user dials into a computer at the ISP's facility using the modem and a standard telephone line. The ISP's computer in turn provides the user with access to the Internet.

Through this Internet connection, the user accesses information on the Web using a computer program called a "Web browser," such as the Netscape Navigator™ from Netscape Communications Corporation. To accomplish this, the user gives the Web browser a Uniform Resource Locator (URL) for an object on the Internet, for example, a document containing information of interest. The document is referred to as a "Web page," and the information contained in the Web page is called "content." Web pages often refer to other Web pages using "hypertext link" or "hyperlinks" that include words or phrases representing the other pages in a form that gives the browser a URL for the corresponding Web page when a user selects a hyperlink. Hyperlinks are made possible by building Web pages using the Hypertext Markup Language (HTML).

The URL identifies a specific computer on the Internet, called a "Web Server," and, more particularly, the location of a Web page located on the Web Server. The Web browser retrieves the Web page and displays it for the user.

The virtually instantaneous and cost-free publication inherent in the WWW leads to problems with information overload. Search engines help users locate specific information on the Web; however, there is time typically only for keyword searches. As a result, one keyword search engine, Alta Vista™ from Digital Equipment Corporation, returns nearly 90,000 hits or URLs for a search for the word "zoology." Thus, the user must review the long list of URLs and access many of the corresponding Web pages to find those that contain sought-after information. This demonstrates the relative lack of utility associated with using keyword search engines available on the Internet.

Researchers are, however, experimenting with intelligent agents to facilitate browsing by "learning" the user's interests based on prior sessions surfing the Web. Two better known research prototypes include WebWatcher and Letizia.

WebWatcher is a server-based interface agent that resides between the user and the Web. Any user running a browser can enter the system simply by typing a topic of interest in WebWatcher's FrontDoor page. WebWatcher replaces the current page with a modified page that embeds WebWatcher command menus and enables WebWatcher to follow the user browsing the Web; and presents the user with a highlighted listing of recommended hyperlinks. Because WebWatcher is a server-based system it logs data from thousands of users to "train" itself and refine its search knowledge. If a user signals that a particular search was successful, WebWatcher annotates each explored hyperlink with user keywords, adding to the knowledge base from previous sessions. WebWatcher uses information retrieval techniques based on the frequency of weighted terms and documents for all hyperlinks on a page, as well as user statistics associated with those links.

Letizia is a client-side personal agent and thus resides on the computer running the user's browser, as opposed to on a separate server. Letizia collects information about the user's browsing habits and tries to anticipate additional items of interest. Making inferences about user interests and using various heuristics, Letizia conducts a resource-limited search of the Web during idle times looking for promising links to suggest when prompted.

While both prototypes try to anticipate a user's interest in accessing certain information, neither addresses the problem of organizing available information on the Web to facilitate browsing. There is therefore a need for a system that organizes or indexes available network information in a structure that permits users to pinpoint the location of information likely to be of interest.

SUMMARY OF THE INVENTION

Accordingly, systems and methods consistent with the present invention substantially obviate one or more of the problems due to limitations, shortcomings, and disadvantages of the related art by incrementally indexing conceptual information in network documents, and integrating the information in a manner usable by the user in a browsing session.

Consistent with the present invention, a method for accessing information from a network comprises the steps, performed by a processor, of: receiving a document from the network containing content; extracting conceptual information from the content of the document; analyzing the extracted conceptual information semantically; and assembling an index of the extracted conceptual information that reflects relations based on semantic data in a stored lexicon.

Both the foregoing general description and the following detailed description are exemplary and explanatory only, and merely provide further explanation of the claimed invention.

BRIEF DESCRIPTION OF THE DRAWINGS

The accompanying drawings, which are incorporated in and constitute a part of this specification, illustrate systems and methods consistent with the invention and, together with the description, explain the advantages and principles of the invention. In the drawings.

DETAILED DESCRIPTION

Reference will now be made in detail to a system and method consistent with the present invention. Wherever possible, the same reference numbers will be used throughout the drawings and the following description to refer to the same or like parts.

Overview

Systems consistent with the present invention assist users browsing the Web by constructing a dynamic conceptual index of documents visited by the browser and documents from the immediate neighborhood of those documents, such as those connected by a hyperlink. The conceptual index is a hierarchically organized taxonomy of word and phrase concepts found in the indexed material along with corresponding locations of those concepts in the documents. Using tools to query and browse the incrementally-built conceptual index, users can access the documents at the specific location corresponding to a selected concept.

The evolving index provides two important functions: (1) an automatically assembled conceptual logbook of the user's path through the Web, and (2) a facility for conceptual "peripheral vision" that displays concepts in documents one step ahead of the browser while navigating the Web.

Conceptual Indexing

Conceptual indexing involves techniques for automatically organizing all of the words and phrases of material into a conceptual taxonomy that explicitly links each concept to its most specific generalizations. The taxonomy is a graph structure that orders concepts by generality using ISA ("is a") links. For example, the following taxonomy represents the relationship between the concepts "computer" and "laptop":

computer
   |—laptop.

In this representation, the "computer" concept is a more general form of the "laptop" concept. Thus, the "computer" concept is depicted as a parent of the "laptop" concept in the graph structure. The taxonomy can be used alone to organize information for browsing, or it can be used as an adjunct to search and retrieval techniques to construct better queries.

Conceptual indexing of text preferably involves four steps: (1) heuristic identification of phrases in the text, (2) mapping these phrases into internal conceptual structures, (3) classifying the structures into a taxonomy, and (4) linking the concept to the location of the phrase in the text. As concepts are assimilated into the conceptual taxonomy during indexing, a broad coverage English lexicon is consulted to determine semantic relationships to other concepts based on recorded knowledge about the meanings of words. If any of the words of an indexed phrase do not yet have conceptual counterparts in the evolving taxonomy, they are assimilated into the taxonomy using information from the lexicon.

For example, if the phrase "graphic workstation" is encountered when indexing a document, the lexicon is examined for the word "workstation" to learn that it is a kind of "computer," and thus assimilate the relation "workstation" ISA "computer" into the taxonomy. The process may recurse on "computer" to uncover more general relationships, all of which are added to the taxonomy. Thus, the phrase "graphic workstation" builds the following taxonomy fragment:

computer
   |—workstation
      |—graphic workstation This example presents a portion of the taxonomy tree structure, with more specific concepts indented under their more general parents. The taxonomy does not contain all of the information from the lexicon, but only the information for words and concepts extracted from the indexed text or from other phrases assimilated into the taxonomy.

After indexing a collection of text, the taxonomy recorded for the concept "computer" might look like this:

```
computer
|
|-- new computer
|    |-- recent toshiba laptop
|
|-- toshiba computer
|    |-- recent toshiba laptop
|
|-- workstation
|    |-- graphic workstation
|
|-- server
|    |--web server
|    |    |-- WWW server
|    |
|    |-- sun's new netra-j server
|
|-- laptop
     |-- recent toshiba laptop
```

There are three types of relationships in the taxonomy: (1) subsumption relationships, (2) structural relationships, and (3) combination of subsumption and structural relationships. The subsumption relationships come from the lexicon. For example, the lexicon provides the following subsumption relationships in the taxonomy:

computer
   |—workstation
   |—server
   |—laptop and
   new
   |—recent.

This means that the lexicon provides the framework for building in the taxonomy structure the relationships between these concepts.

Structural relationships are derived from the phrases in the text being indexed, such as:

workstation
   |—graphic workstation.

If the lexicon does not have information required to assimilate the words into the taxonomy, the words are still assimilated into the taxonomy in accordance with structural relationships from the text.

The following is an example of a combination relationship in the above taxonomy:

new computer
   |—recent toshiba laptop.

In this combination, the relationships between the words "new" and "recent" and the words "computer" and "laptop" are subsumption relationships from the lexicon. Using these subsumption relationships and the structural relationship from the indexed text that indicates the word "toshiba" modifies the word "laptop," the taxonomy builds a relationship between the phrases "new computer" and "recent toshiba laptop," as illustrated above.

The concept of a taxonomy is closely analogous to the organization of books in a library. In general, books on the same topic are located on the same shelf and in close proximity. Similarly, the taxonomy places like concepts in close proximity so that the concept "laptop" is close to "recent toshiba laptop," the concept "server" is close to "WWW server," and so forth.

The taxonomy aids in formulating queries. In querying the index, terms are treated as concepts and are expanded by their specific children in the taxonomy. In this way, a query for "fast computer" will be expanded to a query for "fast computer" and "fast graphic workstation" because "graphic workstation" is a more specific kind of "computer," according to the above taxonomy.

System Architecture

Figure 1:
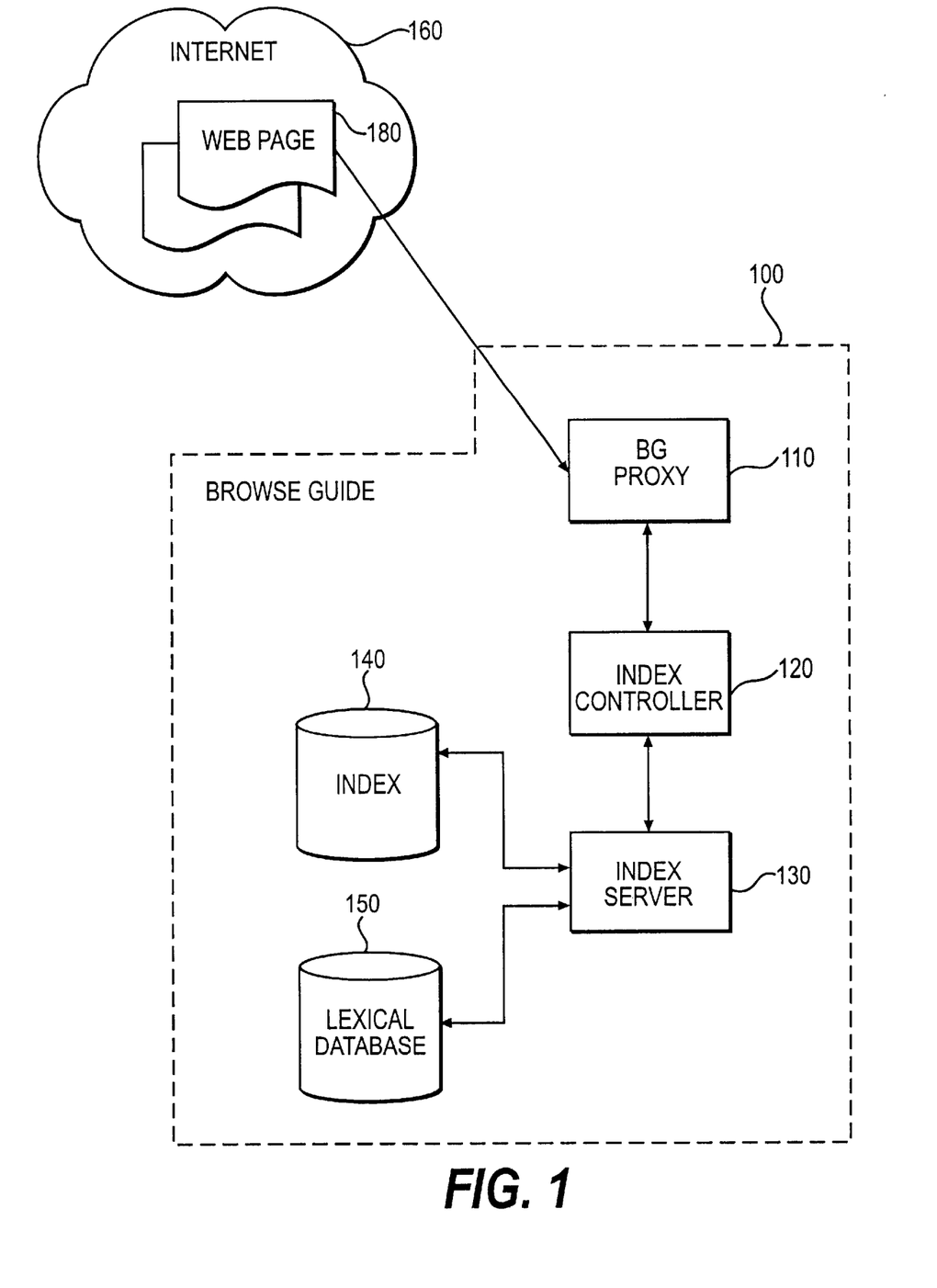
FIG. 1 is a block diagram of the software modules of a browse guide system consistent with the present invention.

FIG. 1 illustrates the components of a browse guide (BG) system 100 consistent with the present invention. BG 100 assists users browsing the Web by constructing a dynamic conceptual index of documents visited by the user using a browser and documents from the immediate neighborhood of those documents. BG 100 includes software modules written in the JAVA programming language. BG 100 is thus platform-independent and can run on any conventional computer, such as a personal computer with a Pentium microprocessor manufactured by Intel Corp. running the Microsoft Windows 95 operating system.

The computer is preferably equipped with hardware, such as a modem, for connecting to the Internet 160, which is depicted in FIG. 1 as the cloud surrounding Web pages 180. This is intended to show that the Web pages 180 constitute documents on the Internet 160 that are accessible to computers connected to the Internet 160.

BG 100 includes BG proxy 110, index controller 120, index server 130, index 140, and lexical database 150. BG proxy 110 performs two general functions: (1) monitoring a user's activity browsing the Web, and (2) accessing information from Web, including documents visited by the user's browser (not shown) and documents from the immediate neighborhood of those documents.

Index controller 120 controls the operations of BG 100 by, in part, maintaining a queue identifying the information and documents to be indexed in the conceptual taxonomy, and index server 130 performs the indexing functions, including incrementally building index 140 using lexical database 150. Lexical database 150 contains the English language lexicon used in building the conceptual taxonomy, i.e., index 140, in accordance with the methodology described above.

System Operation

Figure 2:
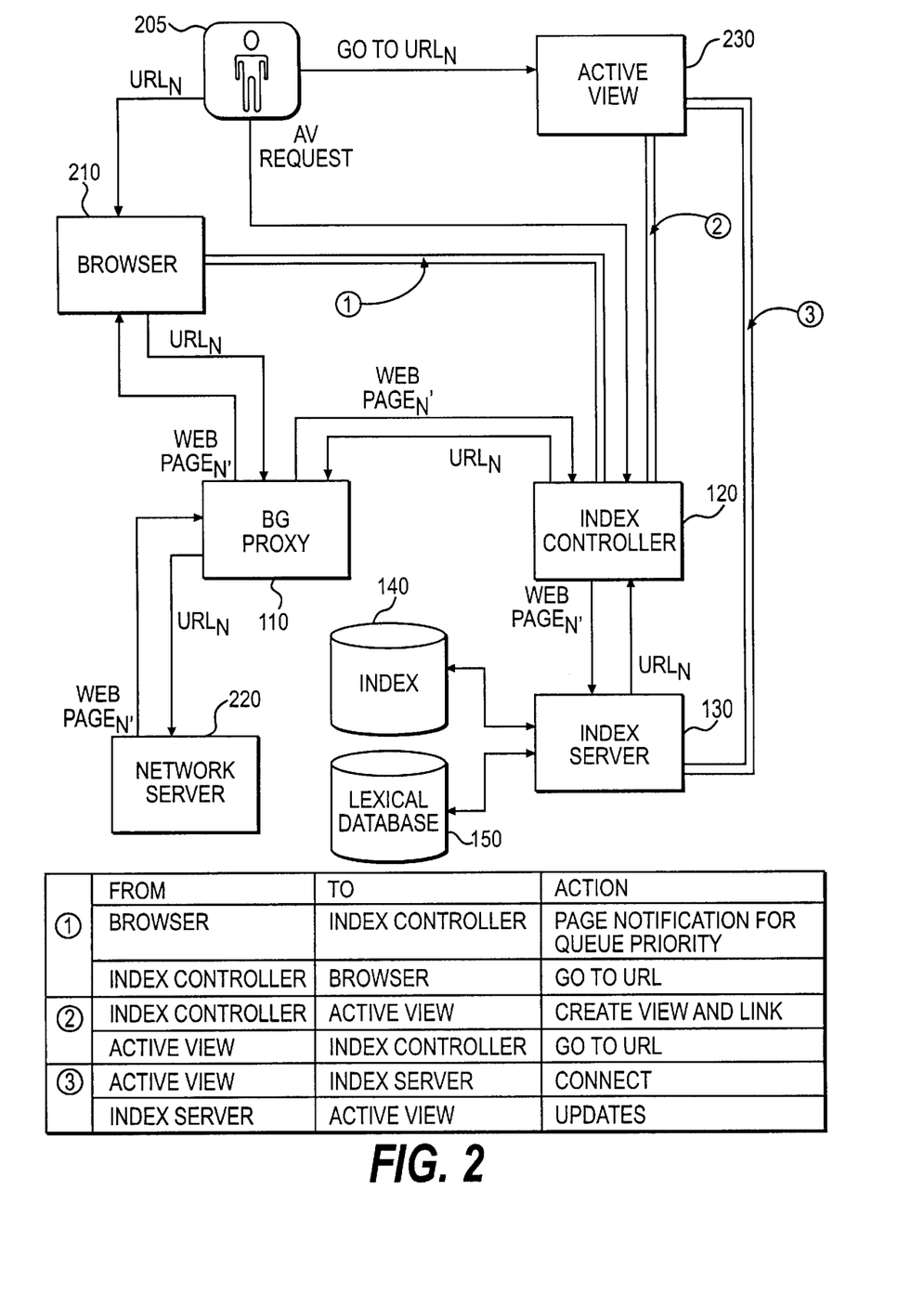
FIG. 2 is a block diagram of the information flow of the browse guide system consistent with the present invention.

FIG. 2 is an information flow diagram that explains the operation of BG 100. In FIG. 2, there are a number of lines connecting the modules that are labeled "$URL_N$." The "URL" in this label represents any URL for a site on the Internet and the subscript "N" indicates that multiple URLs may pass between the modules. There are also a number of lines labeled "WEB $PAGE_N$". The "WEB PAGE" in this label represents any Web page, document, file, etc. available on the Internet, and the subscripted "N" indicates that multiple Web pages may pass between the modules. The single quote (') next to the "N" on a number of the lines with the WEB $PAGE_N$ label indicates that the page has been modified from its original state.

When a user 205 enters a URL into browser 210, which may be a conventional Web browser such as Microsoft Explorer®, he requests to retrieve a Web page from the Internet 160. BG proxy 110 intercepts the URL before providing it to network server 220 on the Internet 160, to retrieve the requested Web page. Network server 220 then provides the Web page identified by the URL to the BG proxy 110, which in turn provides the page to browser 210 for display. However, the retrieved Web page is modified by BG proxy 110. In part, this modification enables index controller 120 to connect to browser 210 and monitor its activity.

BG proxy 110 also provides the retrieved Web page to index controller 120, and Index controller 120 passes the Web page to index server 130 for indexing. The indexing process involves parsing the retrieved Web page, and assimilating the concepts in the Web page into taxonomy index 140 using lexical database 150. In parsing the retrieved Web page, index server 130 also determines the presence of any Web pages referenced in the retrieved Web page by identifying the hyperlinks in that page. If there are any referenced Web pages, index server 130 provides the URLs for those pages to index controller 120.

Index controller 120 maintains a priority queue of URLs for Web pages to be indexed by index server 130. The queue includes the URLs referenced in pages previously indexed. Preferably, the priority is set according to the user's activity, although other priorities are possible. Thus, if the user selects one of the URLs in the queue or another URL not in the queue, index controller 120 causes the retrieval of the corresponding Web page and provides that page to index server 130 for assimilation of the page's concepts into taxonomy index 140 ahead of Web pages for any other URLs in the queue. Additionally, while the queue is not empty, index controller 120 provides each URL in the queue to BG proxy 10 to retrieve the corresponding Web page, which is in turn passed through index controller 120 to index server 130 for assimilation of the concepts in that Web page into index 140.

User 205 can also query index 140. By inputting a query word or phrase, user 205 instructs index controller 120 to generate and display an active view 230 that includes concepts and corresponding URLs from index 140. When index controller 120 receives a request for an active view, it passes the request to index server 130 to access index 140 for the concepts containing the search terms.

BG 100 builds connections between browser 210 and index controller 120, index controller 120 and each active view 230, and index server 130 and each active view 230. These three connections are labeled (1), (2), and (3) in FIG. 2. A key table at the bottom of FIG. 2 explains the information flow along these connections. The first connection (1) between browser 210 and index controller 120 enables index controller to monitor user 205 activity for managing the queue priority.

The second connection (2) between index controller 120 and active view 230 exists as a result of index controller 120 creating active view 230 in response to a request from user 205 and links active view 230 to browser 210 via the first connection (1). This link enables the user to select a concept from active view 230 for display of a corresponding Web page by browser 210.

The third connection (3) between index server 130 and active view 230 exists as a result of index controller 120 creating active view 230 in response to a request from user 205 and links active view 230 to index server 130. This link enables index server 130 to update or refresh the active view 230 when additional information is assimilated into index 140 and active view 230 includes a fragment of index 140 modified by this assimilation. In this fashion, information is dynamically organized in real-time during a browsing session.

Process

BG Proxy Process

Figure 3:
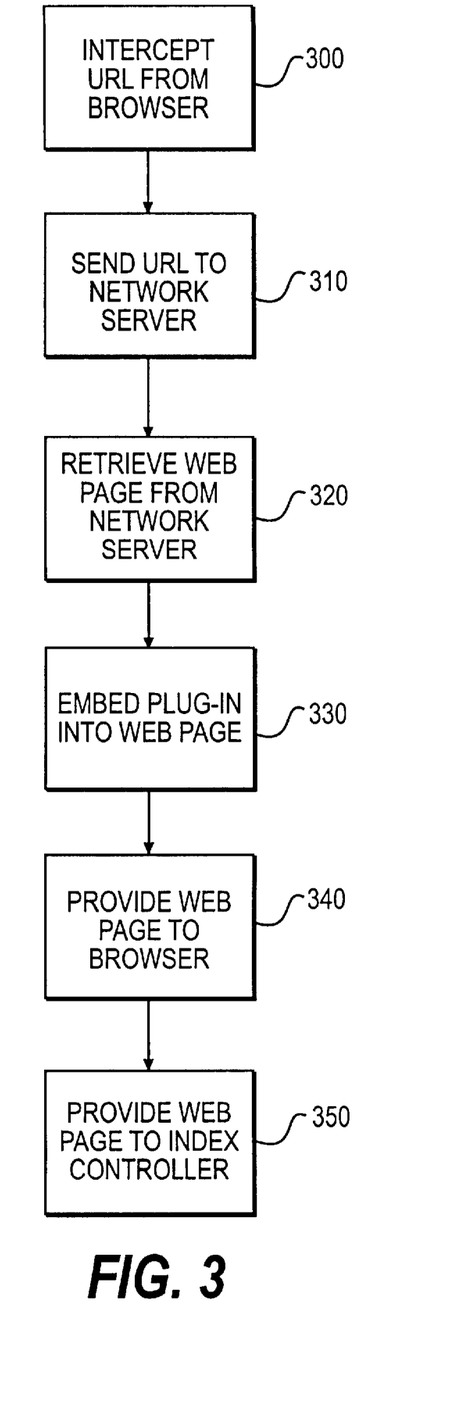
FIGS. 3 and 4 are flow charts of the steps performed by a BG proxy module of the browse guide system consistent with the present invention.
Figure 4:
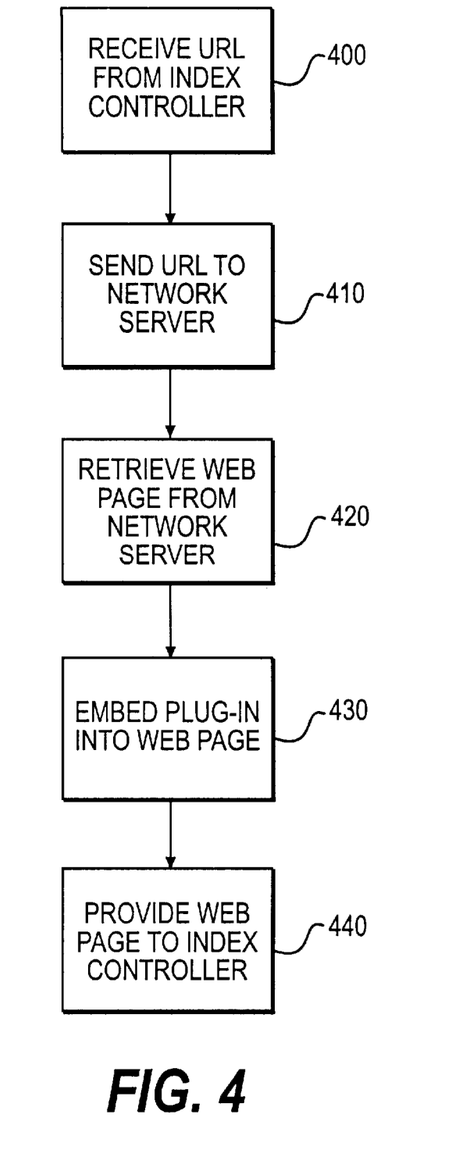
Figure 5:
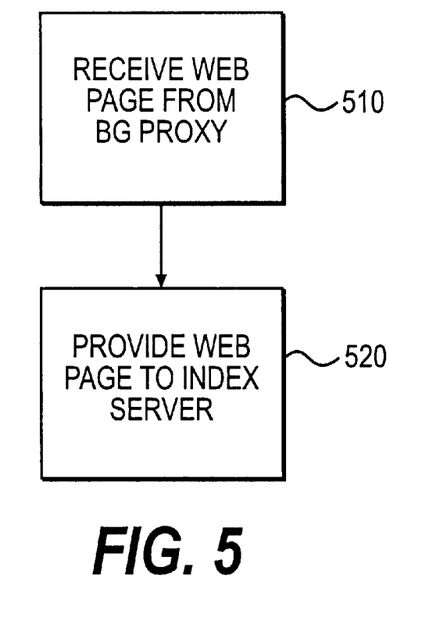
FIGS. 5 to 9 are flow charts of the steps performed by an index controller module of the browse guide system consistent with the present invention.
Figure 6:
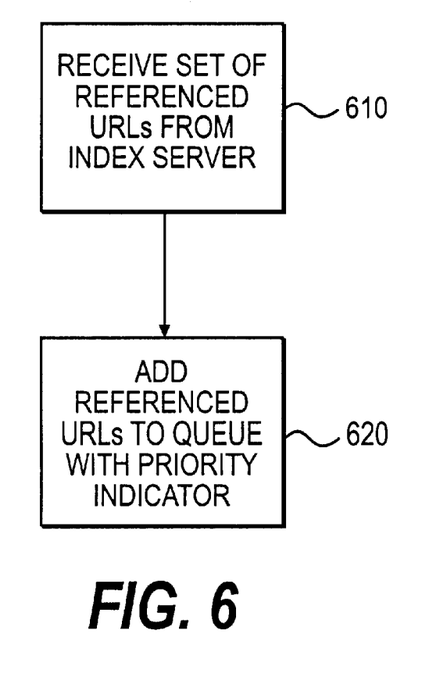
Figure 7:
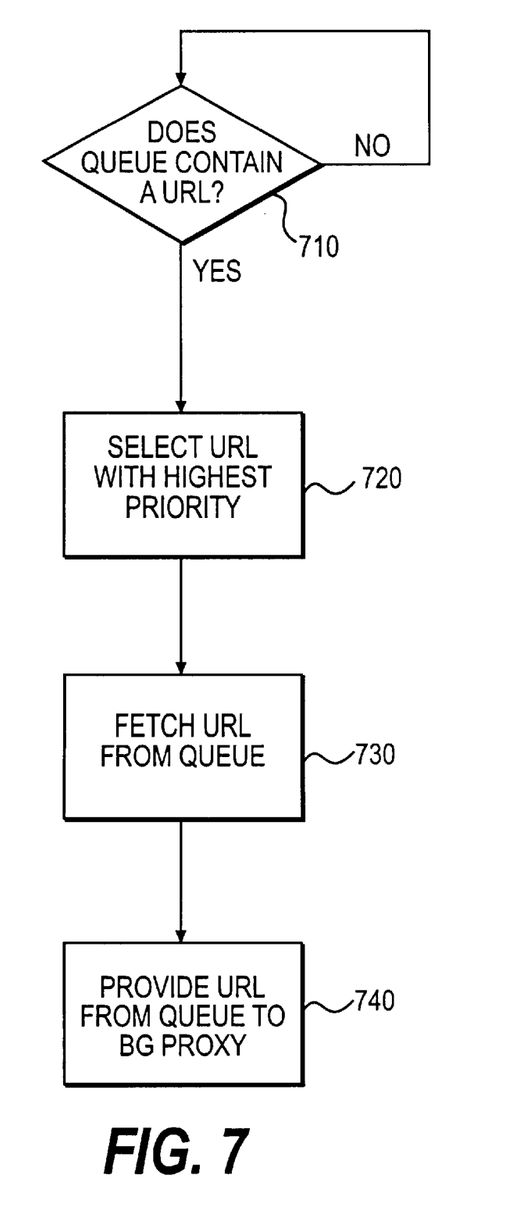
Figure 8:
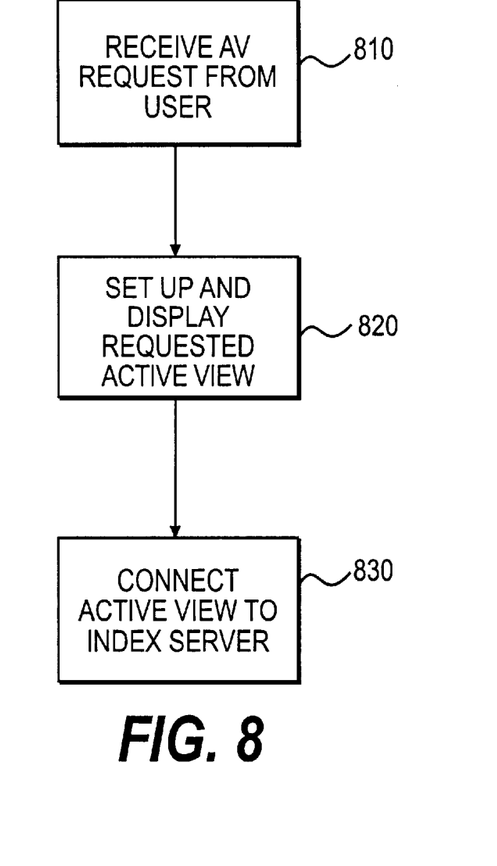
Figure 9:
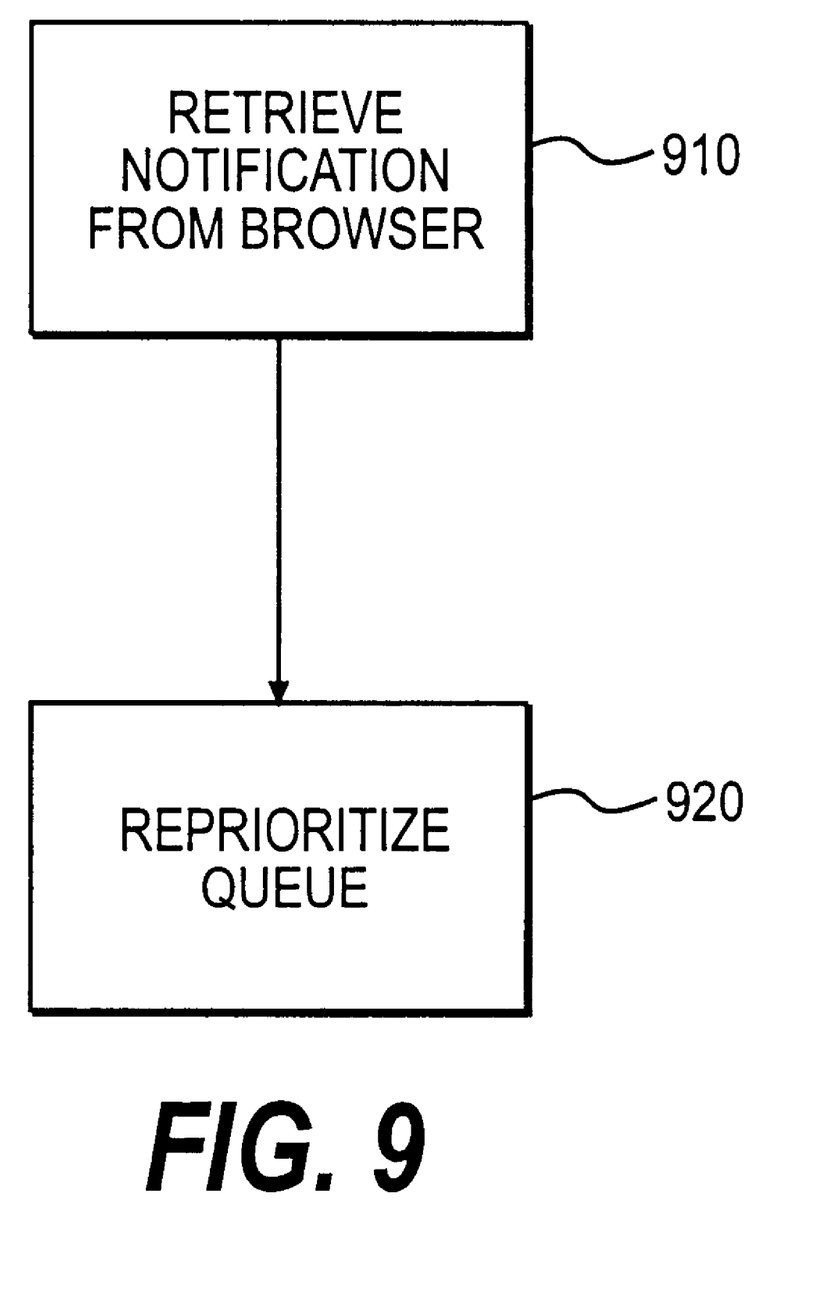

FIGS. 3 and 4 are flow diagrams illustrating the steps of two processes performed by BG proxy 110. The first process relates to the operation intercepting URLs from browser 210 for indexing of the corresponding Web pages, and the second concerns the functions associated with the queue processing operation of index controller 120.

When user 205 enters a URL into browser 210, BG proxy 110 intercepts the input URL from browser 210 (step 300). BG proxy 110 then sends the intercepted URL to network server 220 on the Internet to retrieve the corresponding Web page (step 310). When the Web page is retrieved (step 320), BG proxy 110 embeds a "plug in" into the Web page (step 330). BG proxy 110 provides the modified Web page to browser 210 for display (step 340) and to index controller 120 for further processing by index server 130 (step 350). The embedded "plug-in" is a computer program written in, for example, the C++ programming language, and enables index controller 120 to connect to browser 210 and to monitor activity of browser 210. This in turn enables index controller 120 to prioritize the retrieval of Web pages corresponding to entries in the URL queue.

When URL queue of the index controller 120 is not empty, index controller 120 provides each URL in the queue to BG proxy 110. After BG proxy receives a URL from index controller 120 (step 400), BG proxy 110 transmits the URL to the appropriate network server in the Internet to retrieve the Web page corresponding to the URL (step 410). When BG proxy 10 receives the Web page (step 420), BG proxy 110 embeds the plug-in for index controller 120 (step 430), and then provides the modified Web page to index controller 120 (step 440), which will in turn provide the page to index server 130 for assimilation of the concepts in the page into index 140.

Index Controller Process

FIGS. 5 through 9 are flow charts illustrating the steps of five processes performed by index controller 120. The first process of index controller 120 (see FIG. 5) is a pass-through function. When index controller 120 receives a modified Web page from BG proxy 110 (step 510), index controller provides the modified Web page to index server 130 for assimilation (step 520).

The second process of index controller 120 (see FIG. 6) concerns the URL queue. As described above, index server 130 identifies any URLs in Web pages being indexed. Index controller 120 receives a set of URLs from index server 130 for each Web page that has been indexed (step 610). The set may be empty if the indexed Web page contains no hyperlinks referencing other URLs and Web pages. Each URL in the set is added to the index controller's 120 queue for Web page retrieval and processing in accordance with a priority (step 620). For example, index controller 120 sets a high priority for the set of URLs corresponding to the Web page currently displayed by browser 210. In this manner, browse guide 100 assimilates the pages neighboring the currently displayed page before working on pages for other URLs in the queue.

The next process of index controller 120 (see FIG. 7) also concerns queue processing. The process of FIG. 6 relates to adding items to the queue, and the process of FIG. 7 concerns taking URLs off the queue. First, index controller 120 is constantly monitoring its queue to determine whether there are any URL entries (step 710). If there are no URLs in the queue, then index controller 120 remains in the monitoring state (step 710). If the queue is not empty (step 710), then index controller 120 selects the next URL in the queue with the highest priority and fetches that URL from the queue (steps 720 and 730). Index controller 120 then provides the URL to BG proxy 110 (step 740), which, as explained above with reference to FIG. 4, retrieves the corresponding Web page from the Internet.

Figure 12:
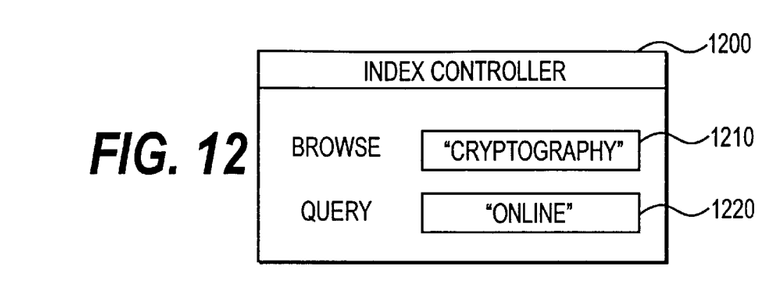
FIG. 12 is an illustration the user interface for the index controller module of the browse guide system consistent with the present invention.
Figure 14:
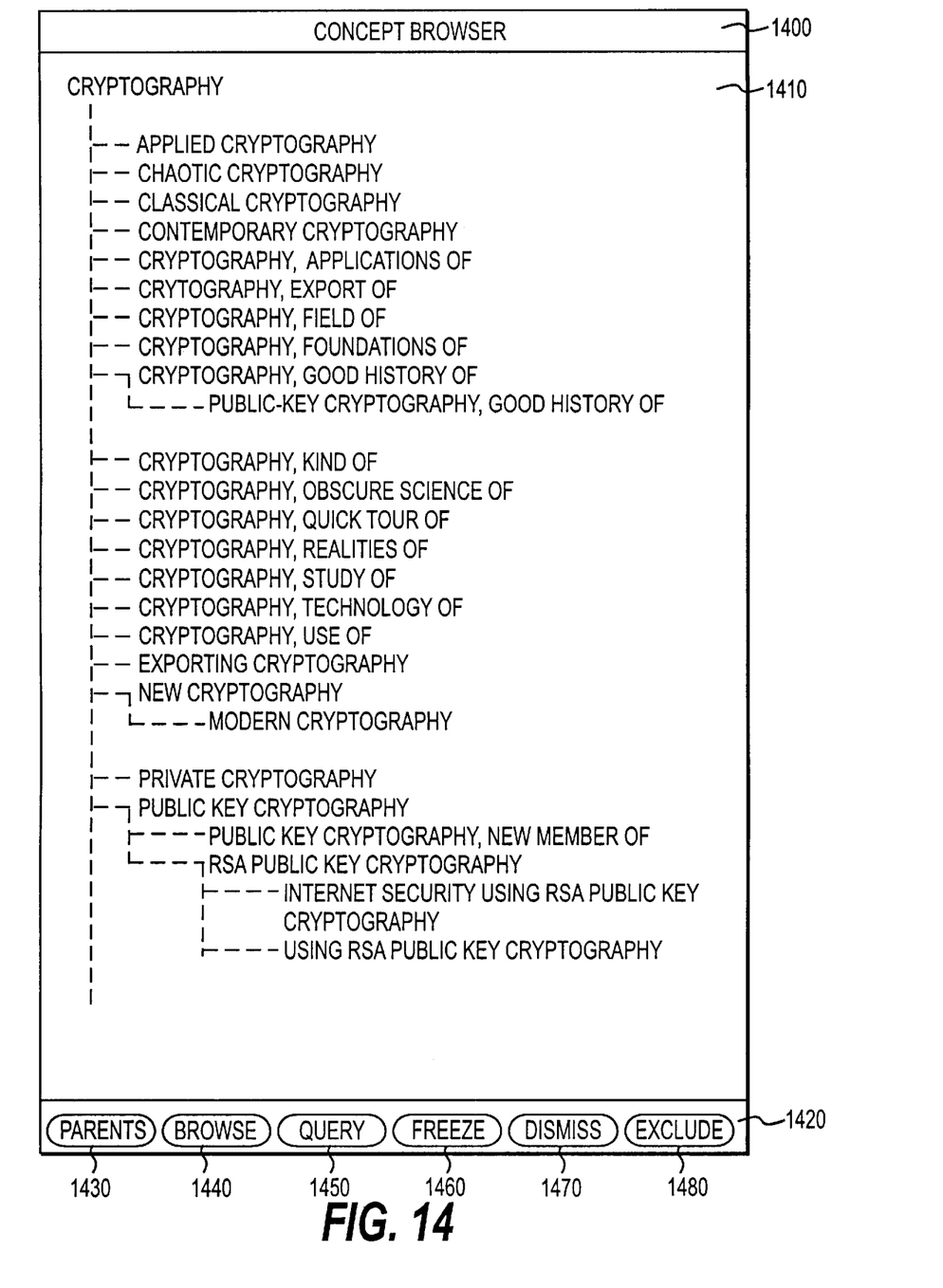
FIG. 14 is an illustration an example of an active view for the browse guide system consistent with the present invention.

The fourth index controller 120 process (see FIG. 8) concerns the second connection (2) (see FIG. 2) between active view 230 and index controller 120. Browse guide 100 includes an interface, such as a display with dialogue boxes, for users to browse and query index 140. An exemplary interface 1200 is shown in FIG. 12 and contains a display with two boxes 1210 and 1220. In the first box 1210, users can input a concept to view a fragment of index 140. As shown, box 1210 includes the word "cryptography". BG 100 would in turn display in a "concept browser" a portion of index 140 with the concept "cryptography" as the most general concept (i.e., at the root) with the more specific concepts branched below. An exemplary concept browser display 1400 for the "cryptography" concept from an exemplary index is shown in FIG. 14.

Display 1400 includes two part: the first part 1410 is the requested taxonomy fragment, and the second part 1420 is for buttons 1430 to 1480 that the user can select to initiate various operations by pointing a mouse icon on a button and clicking on the mouse button. Parents button 1430 is used to display the parents of a select, highlighted concept in area 1410. Browse button 1440 is used to browse through index 140. Query button 1450 is used to allow the user to build an active view from a selected, highlighted concept. Freeze button 1460 is used to instruct the system not to modify area 1410, regardless of whether index 140 assimilates additional Web pages. Dismiss button 1470 is used to instruct browse guide 100 to close the display, and exclude button 1480 is used to eliminate a highlighted concept from the area 1410.

Figure 13:
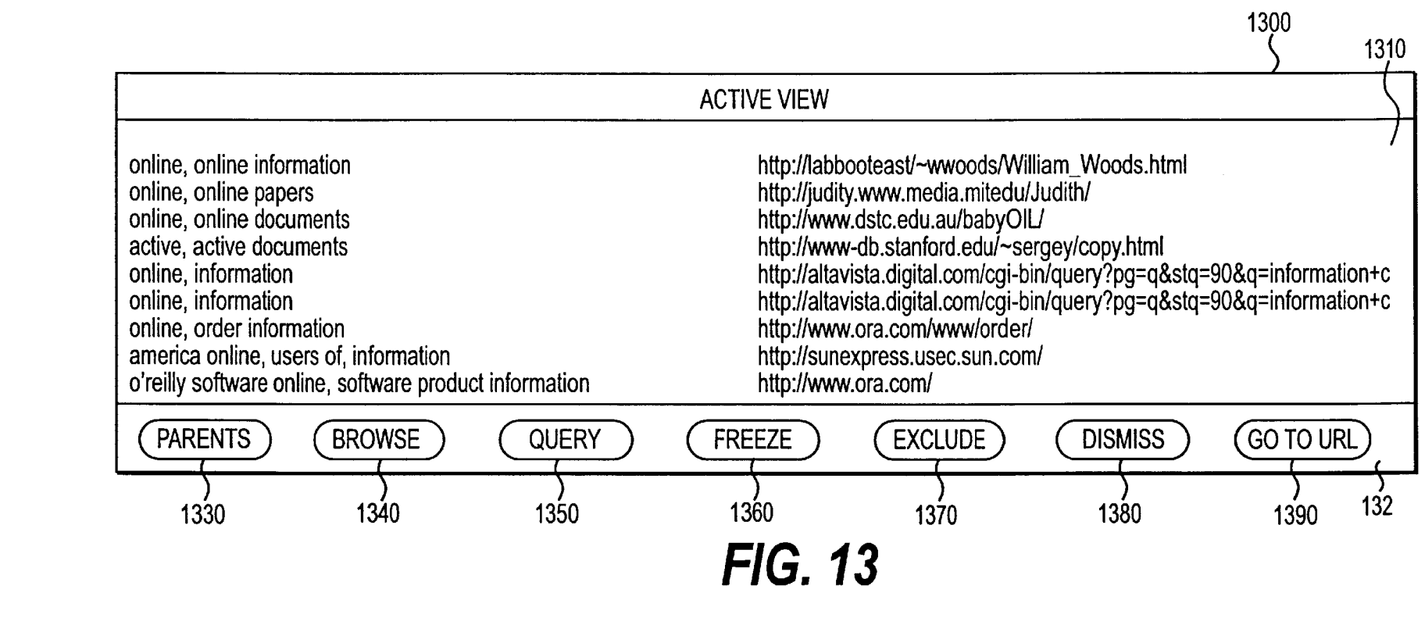
FIG. 13 is an illustration an example of a concept browser for the browse guide system consistent with the present invention.

The second box 1220 in interface 1200 is for the user to select and input a query term for BG 100 to create an active view (i.e., query index 140). Although FIG. 2 shows only one active view, BG 100 preferably supports multiple active views as well as multiple concept browsers so the user can work with many of both view. As shown in FIG. 12, the word "online" in box 1220 is for an active view, and the exemplary active view for the "online" query is shown in FIG. 13.

Display 1300 includes two part: the first part 1310 is the results of a query on index 140 with corresponding URLs, and the second part 1320 is for buttons 1330 to 1390 that the user can select to initiate various operations by pointing a mouse icon on a button and clicking on the mouse button. The query results are ordered or ranked based on a quality of match between the query phrase and text in Web pages using the concepts in index 140. This process is described in U.S. patent application Ser. No. 08/499,268, for "Method and Apparatus for Generating Query Responses in a Computer-Based Document Retrieved System," filed Jul. 7, 1995, which is incorporated herein. Buttons 1330 to 1380 correspond to buttons 1430 to 1480, respectively, and perform the same functions as those described above with reference to buttons 1430 to 1480. When selected by the user, the new "GO TO URL" button 1390 instructs index controller 120 to provide the URL for a highlighted word or phrase to browser 210 to in turn access the identified server and to retrieve and display the corresponding Web page.

Returning to FIG. 8, index controller 120 receives from the user a request to query index 140 in the form of a request for an active view (step 810). When index controller 120 receives such a query, it sets up and displays the requested active view with the results of the query of index 140 (step 820), and connects the active view to index server 130 (step 830). This connection enables index server 130 to update the displayed active view as index 140 changes, assimilating concepts from additional pages.

The fifth process of index controller 120 (see FIG. 9) concerns the connection between index controller 120 and browser 210 (see (1) in FIG. 2)). Index controller monitors browser 210 activity, retrieving notifications from browser 210 as the displayed Web pages selected by the user are displayed (step 910). In response to such notification, index controller 120 reprioritizes the URLs in the queue so that browse guide 100 assimilates concepts of the corresponding Web pages in a priority that closely matches the user's interest, as demonstrated by the Web page currently displayed by browser 210.

Index Server Process

Figure 10:
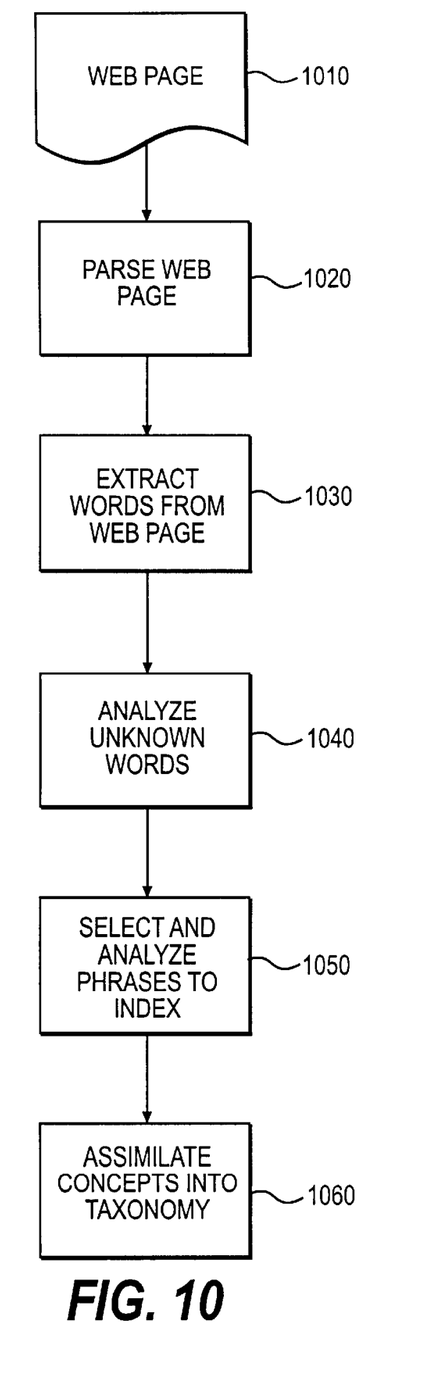
FIGS. 10 and 11 are flow charts of the steps performed by the index server module of the browse guide system consistent with the present invention.
Figure 11:
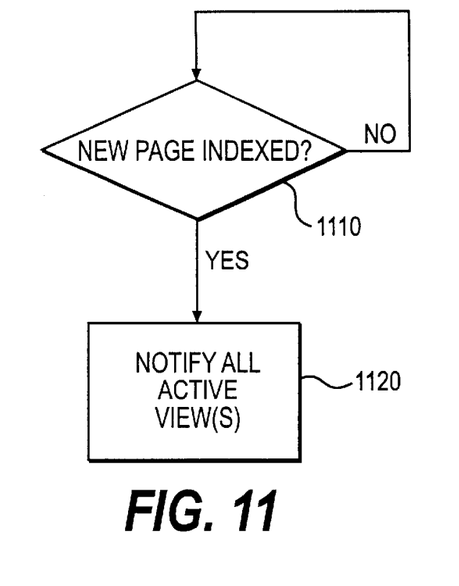

Index server 130 maintains taxonomy index 140 by assimilating concepts from new Web pages into the taxonomy using information from the Web pages and from the relations in lexical database 150. Flow charts of the steps of the two processes performed by index server 130 are shown in FIGS. 10 and 11. In FIG. 10, index server 130 receives as input a Web page (step 1010). While this description focuses on indexing Web pages from the Internet, information from other documents, such as e-mail messages, text files, and databases, may also be assimilated into the taxonomy.

Index server 130 parses the Web page to identify text in the page for assimilation (step 1020), and then extract words from the Web page (step 1030). This extraction process is commonly referred to as "chunkifying" the text, a process by which a set of predetermined rules is used to determine the text in the page that correspond to words. This can be done by a conventional process that involves examining the page for spaces in between characters and punctuation.

Index server 130 then identifies the words that do not appear in lexical database 150 and analyzes those "unknown" words to determine whether they represent concepts capable of assimilation into index 140 (step 1040). This step involves a morphological process in which index server 130 determines whether the unknown words include other known words that exist in lexical database 150. For example, index server 130 parses the word "sparcstation" to determine that it is comprised of two words "sparc" and "station", and to infer from this morphology where to fit the unknown word "sparcstation" in the taxonomy.

After all of the words and phrases in the Web page have been identified (steps 1030 and 1040), index server 130 tags them as different parts of speech, for example, noun, adjective, etc. (step 1050), using known techniques, such as the extracting operation taught by Eric Brill, "Some Advances in Rule-Based Part of Speech Tagging," AAAI Conference, 1994. Index server 130 then assimilates the words and phrases extracted from the Web page into index 140 along with a reference to the location of each word and phrase in the Web page. When a user selects the phrase from an active view, browse guide 100 instructs browser 210 to display a Web page with a highlighted passage corresponding to the selected phrase.

Finally, index server 130 also performs operations in connection with updating active views. When a new page is indexed (step 1110), index server 130 updates all active views affected by changes to index 140. For example, the active view for "online" described above is updated to reflect changes to index 140, such as when additional Web pages that include the word "online" and related concepts are assimilated into index 140.

Conclusion

To overcome the shortcomings of conventional intelligent agents, the present invention automatically organizes information retrieved during a session browsing the Internet in a conceptual index to facilitate the browsing process. Using tools to query and browse the incrementally-built conceptual index, users can access the documents at the specific location corresponding to a selected concept. Since the indexing process involves not only retrieving information from pages actually visited but also from neighboring pages, the present invention provides a "peripheral vision" that displays concepts in documents one step ahead of the browser while navigating the Web.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The scope of the invention is defined by the claims and their equivalents.

What is claimed is:

1. A computer-implemented method for accessing documents from a network, comprising:

providing a browser for accessing documents from the network;

registering a request for an active view corresponding to a designated term;

intercepting a request to access a first document;

determining whether the first document includes the designated term;

automatically accessing a second document, wherein the second document is referenced in the first document;

determining whether the second document includes the designated term; and automatically updating the active view to indicate the presence of the designated term in the first document if the first determination is positive and to indicate the presence of designated term in the second document if the second determination is positive.

2. The method of claim 1, wherein the step of updating the active view includes automatically displaying the active view.

3. The method of claim 1, further comprising displaying the document, wherein the displayed document includes a visual indication of a portion of the document including the designated term.

4. A system for accessing documents from a network, comprising:

a conceptual index identifying specific terms and corresponding locations within documents where specific terms can be found;

a browser for accessing documents from a network; and a proxy server for automatically updating the conceptual index to reflect a location within at least one new document for at least one of the specific terms when the browser accesses the new document from the network.

5. The system of claim 4, further comprising:
an active view registered with the proxy server to be displayed when updating the conceptual index.

6. A method for accessing information from a network comprising the steps, performed by a processor, of:
retrieving from the network a document containing content in response to a user's request;
monitoring the user's behavior accessing documents from the network;
extracting conceptual information from the content of the retrieved document in a manner reflecting the user's behavior;
analyzing the extracted conceptual information semantically; and
assembling an index of the extracted conceptual information that reflects relations based on semantic data in a stored lexicon,
wherein the extracting step includes:
assembling a queue containing references to additional documents referenced in the retrieved document; and
reordering the references to additional documents assembled in the queue based on the monitored user's behavior.

7. A method for accessing information from a network comprising the steps, performed by a processor, of:
retrieving from the network a document containing content in response to a user's request;
monitoring the user's behavior accessing documents from the network;
extracting conceptual information from the content of the retrieved document in a manner reflecting the users behavior;
analyzing the extracted conceptual information semantically; and
assembling an index of the extracted conceptual information that reflects relations based on semantic data in a stored lexicon,
Wherein the monitoring step comprises:
embedding in the retrieved document a plug-in to enable monitoring of the user's behavior.

8. A system for accessing documents from a network, comprising:
a browser for receiving, from a user, requests to access documents from a network and displaying accessed documents;
a network server;
a proxy for intercepting the user's requests;
an index controller for controlling activity of the proxy and monitoring activity of the browser;
an index identifying specific terms and corresponding locations within documents where specific terms can be found;
a lexical database; and
an index server for indexing information and documents in the index based on the lexical database,
wherein the proxy sends the intercepted requests to the network server, receives accessed documents from the network server, modifies each document by embedding a plug-in into the document, and provides each modified document to the browser and the index controller.

* * * * *

UNITED STATES PATENT AND TRADEMARK OFFICE
CERTIFICATE OF CORRECTION

PATENT NO.    : 6,415,319 B1
DATED         : July 2, 2002
INVENTOR(S)   : Jacek Ambroziak It is certified that error appears in the above-identified patent and that said Letters Patent is hereby corrected as shown below:

<u>Column 11,</u>
Line 33, "the users" should read -- the user's --; and

<u>Column 12,</u>
Line 6, "Wherein" should read -- wherein --.

Signed and Sealed this

Nineteenth Day of August, 2003

JAMES E. ROGAN
*Director of the United States Patent and Trademark Office*